United States Patent [19]

Hashimoto et al.

[11] Patent Number: 4,870,114
[45] Date of Patent: Sep. 26, 1989

[54] HEAT-FOAMABLE CROSSLINKED PROPYLENE RESIN COMPOSITION IN THE FORM OF A MELT-SHAPED SHEET STRUCTURE

[75] Inventors: Takashi Hashimoto, Waki; Zenichi Sasaki, Ohtake, both of Japan

[73] Assignee: Mitsui Petrochemical Industries, Ltd., Tokyo, Japan

[21] Appl. No.: 824,548

[22] Filed: Jan. 23, 1986

[30] Foreign Application Priority Data

Jan. 25, 1985 [JP] Japan ................. 60-10781
Feb. 1, 1985 [JP] Japan ................. 60-16636
Feb. 7, 1985 [JP] Japan ................. 60-20941
Feb. 13, 1985 [JP] Japan ................. 60-24382

[51] Int. Cl.$^4$ ............................... C08J 9/00
[52] U.S. Cl. ..................... 521/96; 521/134; 521/143; 521/144; 525/194; 525/240
[58] Field of Search ............... 525/194, 240; 521/134, 521/96

[56] References Cited

U.S. PATENT DOCUMENTS

| | | | |
|---|---|---|---|
| 3,717,559 | 2/1973 | Oyama et al. ............. | 521/921 |
| 4,212,787 | 7/1980 | Matsuda et al. ........... | 521/134 |
| 4,247,652 | 1/1981 | Matsuda et al. ........... | 521/134 |
| 4,510,031 | 4/1985 | Matsumura et al. ........ | 521/134 |
| 4,626,555 | 12/1986 | Endo et al. ............... | 521/134 |
| 4,680,317 | 7/1987 | Kuhnel et al. ............ | 521/134 |

FOREIGN PATENT DOCUMENTS

1189500  4/1970  United Kingdom .

*Primary Examiner*—Morton Foelak
*Attorney, Agent, or Firm*—Sherman and Shalloway

[57] ABSTRACT

A heat-foamable crosslinked propylene resin composition in the form of a melt-shaped sheet structure comprising

[1] 100 parts by weight of a crosslinked propylene resin composition obtained by mixing at least four components composed of (A) a propylene resin, (B) an olefin resin other than the resin (A), (C) a radical initiator and (D) a crosslinking agent, and

[2] 0.5 to 5 parts by weight of a blowing agent; wherein
(a) the propylene resin (A) is in an amount of 60 to 95 parts by weight per 100 parts by weight of the resins (A) and (B) combined, and has a melt flow rate (MFR) of 0.1 to 50 g/10 min., and
(b) the alpha-olefin resin (B) is in an amount of 5 to 40 parts by weight per 100 parts by weight of the resins (A) and (B) combined, and is selected from the group consisting of a propylene random copolymer resin (B1) composed of 55 to 85 mole % of propylene and 15 to 45 mole % of an alpha-olefin with 4 to 20 carbon atoms and having an amount of heat of crystal fusion of 25 to 70 joules/g and a melt flow rate (MFR) of 0.05 to 20 g/10 min. and a 1-butene polymer or a 1-butene random copolymer resin (B2) composed of 70 to 100 mole % of 1-butene and 0 to 30 mole % of an alpha-olefin having 2, 3 or 5 to 20 carbon atoms and having an amount of heat of crystal fusion of 20 to 70 joules/g and a melt flow rate (MFR) of 0.05 to 50 g/10 min., and a process for producing the same.

15 Claims, No Drawings

HEAT-FOAMABLE CROSSLINKED PROPYLENE RESIN COMPOSITION IN THE FORM OF A MELT-SHAPED SHEET STRUCTURE

This invention relates to a heat-foamable crosslinked propylene resin composition in the form of a melt-shaped sheet structure suitable for the production of crosslinked propylene resin foamed articles having excellent properties and appearance.

Specifically, this invention relates to a heat-foamable crosslinked propylene resin composition in the form of a melt-shaped sheet structure capable of providing foamed articles having excellent properties such as high heat resistance, strength and rigidity and a beautiful appearance and containing closed cells of a uniform cell distribution with an expansion ratio of usually at least 2.

More specifically, this invention relates to a heat-foamable crosslinked propylene resin composition in the form of a melt-shaped sheet structure comprising

[1] 100 parts by weight of a partially crosslinked propylene resin composition obtained by mixing at least four components composed of (A) a propylene resin, (B) an olefin resin other than the resin (A), 0.05 to 0.5 parts by weight, per 100 parts by weight of the resins (A) and (B) combined, of a radical initiator (C) and 0.1 to 1 part by weight, per 100 parts by weight of the resins (A) and (B) combined, of (D) a crosslinking agent at a temperature at which the radical initiator decomposes to form the partially crosslinked propylene resin [1], and

[2] 0.5 to 5 parts by weight of a blowing agent capable of generating a gas when heated at the temperature at which the heat-foamable partially crosslinked propylene resin composition in the form of a melt-shaped sheet structure is foamed; wherein (a) the propylene resin (A) is in an amount of 60 to 95 parts by weight per 100 parts by weight of the resins (A) and (B) combined, contains 0 to 30 mole % of an alpha-olefin other than propylene and has a melt flow rate (MFR), determined by ASTM D1238L, of 0.1 to 50 g/10 min., and (b) the alpha-olefin resin (B) is in an amount of 5 to 40 parts by weight per 100 parts by weight of the resins (A) and (B) combined, and is selected from the group consisting of a propylene random copolymer resin (B1) composed of 55 to 85 mole % of propylene and 15 to 45 mole % of an alpha-olefin with 4 to 20 carbon atoms and having an amount of heat of crystal fusion, determined by thermal analysis on a differential scanning calorimeter, of 25 to 70 joules/g and a melt flow rate (MFR), determined by ASTM D1238L, of 0.05 to 20 g/10 min. and a 1-butene polymer or a 1-butene random copolymer resin (B2) composed of 70 to 100 mole % of 1-butene and 0 to 30 mole % of an alpha-olefin having 2, 3 or 5 to 20 carbon atoms and having an amount of heat of crystal fusion, determined by thermal analysis on a differential scanning calorimeter of 20 to 70 joules/g and a melt flow rate (MFR), determined by ASTM D1238L, of 0.05 to 50 g/10 min.

This invention also pertains to a process for producing the aforesaid heat-foamable crosslinked propylene resin composition in the form of a melt-shaped sheet structure.

Propylene resin foamed articles such as polypropylene foamed articles, have better heat resistance, strength, rigidity, etc. than ethylene resin foamed articles such as polyethylene foamed articles, and therefore are attracting interest as materials useful as high-temperature heat insulating materials, packaging materials, building materials, light-weight structural materials, etc.

However, since polypropylene has much lower viscoelasticity in the molten state than polyethylene such as high-pressure low-density polyethylene a heat-foamable polypropylene composition cannot withstand the pressure of the blown gas during melt-foaming, and most of the blown gases dissipate from the molten composition making it very difficult to give foamed articles of good properties. Attempts have been made to overcome the aforesaid difficulty in the production of propylene resin foamed articles by producing crosslinked propylene resin foamed articles utilizing a radical initiator and a crosslinking agent.

One such attempt is disclosed in Japanese Patent Publication No. 31754/1971 (published on Sept. 16, 1971). This patent document points out that uniformly crosslinked foamed articles containing fine closed cells with a high expansion ratio are very difficult to obtain by a process comprising kneading and molding a composition comprising a propylene resin, a blowing agent capable of generating a gas upon heating, a radical initiator and a crosslinking agent at a temperature below the decomposition temperature of the blowing agent, and heat-foaming the resulting crosslinked propylene resin composition. Thus, the Japanese patent document proposed an improvement in the above process, characterized in that the crosslinking of the composition during its kneading is controlled by adding to the composition a radical scavenger, for example a radical reaction inhibitor such as 2,6-di-b-butyl-4-methylphenol, t-butylcatechol, hydroquinone or diphenylpicryl hydrazine, or an antioxidant. The objective of this patent document is to greatly reduce crosslinkage which may form during the kneading and molding operation, by a process comprising a step of kneading and molding a heat-foamable composition comprising a polypropylene resin, a blowing agent, a radical initiator, a crosslinking agent and a radical scavenger and a step of heating the resulting molded product to a temperature above the decomposition temperature of the radical initiator and the blowing agent to crosslink and foam the molded product. The results obtained by this process, however, are not entirely satisfactory.

The above Japanese patent document states that in addition to crystalline polypropylene and crystalline propylene copolymers having a propylene content of at least 70% by weight, a mixture of crystalline polypropylene and another organic polymeric substance can also be used as the polypropylene resin; and cites polyethylene, an ethylene/vinyl acetate copolymer, an ethylene/propylene copolymer, an ethylene/acrylic acid copolymer, polybutadiene, chlorinated polypropylene and chlorinated polyethylene as the other organic polymeric substance. However, this patent document is quite silent on the propylene random copolymer resin (B1) and the 1-butene polymer or the 1-butene random copolymer resin (B2) which are essential in the present invention.

Investigations of the present inventors have shown that the organic polymeric substances exemplified in the above Japanese patent document, even when used in combination with the propylene resin (A) essential in this invention, does not serve to provide a satisfactory crosslinked propylene resin foamed article, or rather tends to reduce foamability, as shown experimentally in Comparative Examples given below (for examples Tables 1, 9, 16 and 23). The inventors presume that this is because the rate of the crosslinking reaction by the radical initiator is much higher than that in the case of using the propylene resin (A) alone and the interfacial affinity of the organic polymeric sustances for the propylene resin (A) is poor.

The present inventors have conducted research in order to provide an improved heat-foamable crosslinked propylene resin composition in the form of a melt-shaped sheet structure which is suitable for the production of crosslinked propylene resin foamed articles having excellent properties and appearance; and have found that for the provision of crosslinked propylene resin foamed articles having excellent properties and appearance, the selection and combination of the propylene resin (A) and the olefin resin (B) other than the resin (A) in the starting resin composition is an important factor.

Further investigations made on the basis of this new finding have led to the discovery that when the resins (A) and (B) having the following characteristics (a) and (b) are combined, there can be obtained a heat-foamable crosslinked propylene resin composition in the form of a melt-shaped sheet structure capable of giving foamed articles containing fine closed cells of a uniform cell distribution with a high expansion ratio and having excellent heat resistance, strength and rigidity and a beautiful appearance.

(a) The propylene resin (A) is used in an amount of 60 to 95 parts by weight per 100 parts by weight of the resins (A) and (B) combined, contains 0 to 30 mole % of an alpha-olefin other than propylene and has a melt flow rate (MFR), determined by ASTM D1238L, of 0.1 to 50 g/10 min.

(b) The alpha-olefin resin (B) is used in an amount of 5 to 40 parts by weight per 100 parts by weight of the resins (A) and (B) combined, and is selected from the group consisting of a propylene random copolymer resin (B1) composed of 55 to 85 mole % of propylene and 15 to 45 mole % of an alpha-olefin with 4 to 20 carbon atoms and having an amount of heat of crystal fusion, determined by thermal analysis on a differential scanning calorimeter, of 25 to 70 joules/g and a melt flow rate (MFR), determined by ASTM D1238L, of 0.05 to 20 g/10 min. and a 1-butene polymer or a 1-butene random copolymer resin (B2) composed of 70 to 100 mole % of 1-butene and 0 to 30 mole % of an alpha-olefin having 2, 3 or 5 to 20 carbon atoms and having an amount of heat of crystal fusion, determined by thermal analysis on a differential scanning calorimeter of 20 to 70 joules/g and a melt flow rate (MFR), determined by ASTM D1238L, of 0.05 to 50 g/10 min.

It is an object of this invention therefore to provide a heat-foamable crosslinked propylene resin composition in the form of a melt-shaped sheet structure suitable for the production of crosslinked propylene resin foamed articles having excellent properties and appearance.

Another object of this invention is to provide a process for producing the heat-foaming crosslinked propylene resin composition.

The above and other objects and advantages of this invention will become apparent from the following description.

In the heat-foamable crosslinked propylene resin composition in the form of a melt-shaped sheet structure in accordance with this invention, the propylene resin (A) is used in an amount of 60 to 95 parts by weight per 100 parts by weight of the resins (A) and (B) combined, contains 0 to 30 mole %, preferably 0 to 15 mole %, of an alpha-olefin other than propylene and has a melt flow rate (MFR), determined by ASTM D1238L, of 0.1 to 50 g/10 min., preferably 0.5 to 20 g/10 min.

Examples of the alpha-olefin other than propylene as a comonomer contained in an amount of up to 30 mole %, preferably up to 15 mole %, in the propylene resin (A) include alpha-olefins having 2 to 10 carbon atoms such as ethylene, 1-butene, 4-methyl-1-pentene, 1-hexene, 1-octene and 1-decene. Desirably, the propylene resin (A) selected from the aforesaid polypropylene and propylene copolymers is crystalline.

The use of the propylene resin (A) having an MFR too low below the specified limit reduces the flowability of the crosslinked propylene resin composition [1] and makes it difficult to form the heat-foamable crosslinked propylene resin composition of this invention by extrusion. On the other hand, the use of the propylene resin (A) having an MFR too high above the specified limit impairs the improvement of foamability and leads to un unduly increased amount of component (D).

In the starting composition used in this invention, the olefin resin (B) other than the resin (A) is used in an amount of 5 to 40 parts by weight per 100 parts by weight of the resins (A) and (B) combined, and is selected from the group consisting of a propylene random copolymer resin (B1) composed of 55 to 85 mole %, preferably 60 to 80 mole %, of propylene and 15 to 45 mole %, preferably 20 to 40 mole %, of an alpha-olefin with 4 to 20 carbon atoms and having an amount of heat of crystal fusion, determined by thermal analysis on a differential scanning calorimeter, of 25 to 70 joules/g, preferably 30 to 60 joules/g and a melt flow rate (MFR), determined by ASTM D1238L, of 0.05 to 20 g/10 min., preferably 0.1 to 10 g/10 min. and a 1-butene polymer or a 1-butene random copolymer resin (B2) composed of 70 to 100 mole %, preferably 75 to 100 mole %, of 1-butene and 0 to 30 mole % of an alpha-olefin having 2, 3 or 5 to 20 carbon atoms and having an amount of heat of crystal fusion, determined by thermal analysis on a differential scanning calorimeter of 20 to 70 joules/g, preferably 30 to 60 joules/g and a melt flow rate (MFR), determined by ASTM D1238L, of 0.05 to 50 g/10 min., preferably 0.1 to 20 g/10 min.

Preferably, the resin (B1) has a DSC melting point (measured by a differential scanning calorimeter) of 80° to 130° C., especially 90° to 120° C., and the resin (B2) has a DSC melting point of 70° to 130° C., especially 80° to 130° C.

If the resin (B1) has an MFR too low below the specified limit, its uniform dispersion in the resin (A) becomes difficult. If the MFR of the resin (B1) is too high above the specified limit, the amount of the component (D) to be used should be unduly increased in order to improve the foamability of the resin composition by being co-crosslinked together with the resin (A). This is not practical. If the resin (B1) has a propylene content too high above the specified limit and/or an amount of heat of crystal fusion by DSC too large above the specified limit, the crosslinked propylene resin composition [1] has reduced formability and a larger and less uniform cell size. On the other hand, if the propylene content is too low below the specified limit and/or the amount of heat of crystal fusion by DSC is too small below the specified limit, the uniform dispersion of the resin (A) becomes difficult, and the components (C) and (D) and component [2] have an increased tendency to be localized in the resin (B1) portion. Consequently, the efficiency of co-crosslinking with the resin (A) and the ability of the resin composition to be foamed uniformly are reduced.

Preferably, the resin (B1) has a microisotacticity (abbreviated MIT), based on three propylene chains, of at least 0.7, especially at least 0.8 and a boiling n-heptane-insoluble content of not more than 5% by wight, especially not more than 3% by weight. When these preferred conditions are selected, a foamed article of the resulting resin composition has further increased chemical resistance, particularly resistance to organic solvents, and higher heat resistance and rigidity.

Examples of the alpha-olefin having 4 to 20 carbon atoms as the comonomer in the resin (B1) are 1-butene, 4-methyl-1-pentene, 1-hexene, 1-octene, 1-decene, 1-tetradecene and 1-octadecene.

The amount of heat of crystal fusion (joules/g) of the resin (B) is determined by thermal analysis using a differential scanning calorimeter (DSC) as follows: The area of an endothermic portion due to the crystal fusion of the resin (B) is measured by a differential scanning calorimeter, and the amount of heat of crystal fusion is calculated on the basis of the mount of heat of fusion of indium.

The above amount of heat of fusion and the melting point are measured under the following measuring conditions. A sample is left to stand at 200° C. for 5 minutes, cooled to $-35°$ C. at a rate of 10° C./min., and left to stand at $-35°$ C. for 1 minute. Thereafter, the sample is subjected to thermal analysis by heating it from $-35°$ C. to 200° C. at a temperature-elevating rate of 20° C./min.

In the present invention, the microisotactity of the resin (B1) is determined by the following method. A portion having three propylene chains is examined by $^{13}C$ NMR spectroscopy, and the proportion of three propylenes isotactically arranged is determined and defined as the microisotacticity (MIT).

The boiling n-heptane-insoluble content of the resin (B1) is determined by the following method. A test sample as a small piece having a size of about 1 mm$\times$1 mm$\times$1 mm and glass beads are put in a cylindrical glass filter (G3), and the sample is extracted with boiling n-heptane by a Soxhlet extractor for 14 hours. The reflux frequency is about 1 per 15 minutes. The weight percent of the boiling n-heptane-insoluble portion is determined by weighing the molten portion or the insoluble portion.

If the resin (B2) has an MFR too low below the specified limit, its uniform dispersion of the resin (B2) in the resin (A) becomes difficult. If the MFR of the resin (B2) is too high above the specified limit, the amount of the component (D) to be used should be unduly increased in order to improve the foamability of the resin composition by being co-crosslinked together with the resin (A). This is not practical. If the resin (B2) has a 1-butene content too low below the specified limit and/or an amount of heat of crystal fusion by DSC too small below the specified limit, its uniform dispersion in the resin (A) becomes difficult, and the components (C) and (D) and component [2] have an increased tendency to be localized in the resin (B2) portion. Consequently, the efficiency of co-crosslinking with the resin (A) and the ability of the resin composition to be foamed uniformly are reduced.

Examples of the alpha-olefin having 2, 3 or 5 to 20 carbon atoms as the comonomer in the resin (B2) are ethylene, propylene, 4-methyl-1-pentene, 1-hexene, 1-octene, 1-decene, 1-tetradecene and 1-octadecene.

The propylene resin (A), the propylene copolymer resin (B1), the 1-butene polymer and the copolymer resin (B2) can be produced by methods known per se, or are commercially available. For example, such resins can be obtained by polymerizing propylene, random-copolymerizing propylene with the other alpha-olefin, polymerizing 1-butene, or copolymerizing 1-butene with the other alpha-olefin in the presence of a catalyst formed from (i) a composition at least comprising magnesium, titanium and halogen, (ii) an organometallic compound of a metal of Groups I to III of the periodic table and (iii) an electron donor. A part or the whole of the electron donor (iii) may be fixed to a part or the whole of the composition (i). Prior to use, the electron donor (iii) may be pre-contacted with the organometallic compound (ii). According to an especially preferred embodiment, part of the electron donor (iii) is fixed to the composition (i), and the remainder is directly added to the polymerization system or prior to use, is contacted with the organometalilc compound (ii). In this case, the electron donor fixed to the composition may be the same as, or different from, the electron donor to be directly added to the polymerization system or pre-contacted with the organometallic compound (ii).

The radical initiator (C), the crosslinking agent (D), and the blowing agent [2] used in this invention may be those which are generally known in the art. Their amounts may also be within the ranges generally known in the art. The radical intiator (C) is preferably an organic peroxide or an organic peroxy ester. Preferably, the decomposition temperature of the radical initiator (C) at which the half life of the radical initiator is 1 minute is higher than the DSC melting point of the resin (B) and especially the DSC melting point of the resin (A).

For practical purposes, it is preferred that the decomposition temperature of the radical initiator (C) at which its half life is 100 hours be at least 40° C.

Examples of the component (C) include
(1) 3,5,5-trimethylhexanoyl peroxide,
(2) octanoyl peroxide,
(3) decanoyl peroxide,
(4) lauroyl peroxide,
(5) succinyl peroxide,
(6) acetyl peroxide,
(7) tertiary butyl peroxy(2-ethylhexanoate),
(8) meta-toluoyl peroxide,
(9) benzoyl peroxide,
(10) tertiary butyl peroxyisobutyrate,
(11) 1,1-bis(tertiary butylperoxy)-3,3,5-trimethylcyclohexane,
(12) 1,1-bis(tertiary butylperoxy)cyclohexane,
(13) tertiary butylperoxymaleic acid,
(14) tertiary butyl peroxylaurate,
(15) tertiary butyl peroxy-3,5,5-trimethylhexanoate,
(16) cyclohexanone peroxide,
(17) tertiary butyl peroxyisopropylcarbonate,
(18) 2,5-dimethyl-2,5-di(benzoylperoxy)hexane,
(19) tertiary butyl peroxyacetate,
(20) 2,2-bis(tertiary butyl peroxy)butane
(21) tertiaty butyl peroxybenzoate,
(22) n-butyl-4,4-bis(tertiary butylperoxy)valerate,
(23) ditertiary butyl diperoxyisophthalate,
(24) methyl ethyl ketone peroxide,
(25) $\alpha,\alpha$-bis(tertiary butylperoxyisopropyl)benzene,
(26) dicumyl peroxide,

(27) 2,5-dimethyl-2,5-di(tertiary butylperoxy)hexane,
(28) tertiary butyl cumyl peroxide,
(29) diisopropylbenzene hydroperoxide,
(30) ditertiary butyl peroxide,
(31) p-menthane hydroperoxide,
(32) 2,5-dimethyl-2,5-di(tertiary butylperoxy)hexyne-3,
(33) 1,1,3,3-tetramethylbutyl hydroperoxide,
(34) 2,5-dimethylhexane 2,5-dihydroperoxide,
(35) cumene hydroperoxide, and
(36) tertiary butyl hydroperoxide.

Of these, the compounds (12) to (36) are preferred.

Crosslinking compounds such as unsaturated compounds having one or more double bonds, oxime compounds, nitroso compounds and maleimide compounds may be used as the crosslinking agent (D) in this invention. The crosslinking agent (D) reacts with polymer radicals formed by intramolecular hydrogen extraction from the resin (B) and the resin (A) before the radials undergo cleavage reaction, thereby to stabilize the polymer radicals, and at the same time serves to increase the efficiency of co-crosslinking of the resin (B) and the resin (A) and the efficiency of crosslinking of each of the resins (A) and (B).

Examples of the component (D) include polyfunctional monomers such as triallyl cyanurate, triallyl isocyanurate, ethylene glycol dimethacrylate, trimethylolpropane trimethacrylate, diallyl phthalate, pentaerythritol triacrylate, neopentyl glycol diacrylate, 1,6-hexanediol dimethacrylate and divinylbenzene; oxime compounds such as quinonedioxime and benzoquinonedioxime; and other crosslinking compounds such as p-nitrosophenol and N,N-m-phenylene bismaleimide.

The blowing agent [2] used in the composition of this invention is a chemical substance which is liquid or solid at room temperature and when heated, decomposes to generate a gas. It has a decomposition temperature above the DSC melting point of the resin (A) and no particular restriction is imposed on it so long as it does not inhibit the crosslinking reaction. Examples of the blowing agent [2] include azodicarbonamide, barium azodicarboxylate, N,N'-dinitrosopentamethylenetetramine, 4,4-hydroxybis(benzenesulfonylhydrazide), diphenylsulfone-3,3-disulfonylhydrazide, p-toluenesulfonyl semicarbazide, trihydrazinotriazine, biurea and zinc carbonate. Of these, azodicarbonamide, N,N'-dinitropentamethylenetetramine and trihydrazinotriazine are preferred because they evolve large amounts of gases and the temperature at the end of gas generation is sufficiently lower than the temperature at which the mixture of the resins (A) and (B) begins to be thermally degraded.

The amount of the propylene resin (A) used in his invention is 60 to 95 parts by weight, preferably 70 to 90 parts by weight, per 100 parts by weight of the resins (A) and (B) combined, and the amount of the resin (B) used is 5 to 40 parts by weight, preferably 10 to 30 parts by weight, per 100 parts by weight of the resins (A) and (B) combined. If the amount of the resin (B) is less than 5 parts by weight, the dispersibility of the components (C) and (D) is poor. Moreover, the inhibition of the decomposition of the resin (A) by the component (C) is insufficient and a good foamed article is difficult to obtain. If, on the other hand, the amount of the resin (B) exceeds 40 parts by weight, the resulting foamed article has reduced heat resistance, strength and rigidity.

The amount of the radical initiator (C) in the composition of this invention is 0.05 to 0.5 part by weight, preferably 0.1 to 0.3 part by weight, per 100 parts by weight of the resins (A) and (B) combined. The amount of the crosslinking agent (D) is 0.1 to 1 part by weight, preferably 0.2 to 0.5 part by weight. The amount of the blowing agent [2] is 0.5 to 5 part by weight, preferably 1 to 3 parts by weight, per 100 parts by weight of the crosslinked propylene resin [1]. If the amount of the component (C) is too small below the specified limit, a suitable increase in the melt viscoelasticity of the mixture of the resins (A) and (B) cannot be achieved, and the blown gas tends to dissipate out of the system. Consequently, a foamed article having good closed cells is difficult to obtain. On the other hand, if it is too large above the specified limit, cleavage occurs in the polymer chain portion of the resin (A) and/or the resin (B) to decrease the melt viscoelasticity of the mixture of the resins (A) and (B) and a foamed article having good closed cells cannot be obtained. If the amount of the component (D) is too small below the specified limit, the melt viscoelasticity of the mixture of the resins (A) and (B) cannot be increased as desired, and the blown gas dissipates out of the system to make it difficult to obtain a foamed article having good closed cells. If the amount of the component (D) is too large above the specified limit, the degree of crosslinkage becomes excessive. As a result, it is difficult to produce a foam precursor and/or a foamed article, or the resulting molded article has a poor surface texture.

Furthermore, when the radical initiator (C) is used in an amount smaller than the amount required for crosslinking, some of the crosslinking agent (D) remains in the free state; and safety and hygiene problems arise owing to offensive odors, dissolving of the free crosslinking agent, etc. In addition, this is a waste of the crosslinking agent and is not practical.

If the amount of the blowing agent [2] is too small below the specified limit, a foamed article having an expansion ratio of at least 2 cannot be obtained. If it is too large above the specified limit, the expanding force of the generated gas becomes too large. As a result, the elongation of the molten resin film becomes insufficient, and the film begins to break. The gas therefore escapes from the resin, and the ratio of the gas utilized decreases. Finally, the expansion ratio decreases and the ratio of closed cells formed decreases.

Preferably, 0.05 to 0.5 part by weight, especially 0.1 to 0.3 part by weight, per 100 parts by weight of the resins (A) and (B) combined, of a phenolic heat stabilizer (E) may be added to the composition of this invention in order to control the concentration of the polymer radicals generated and increase the crosslinking efficiency and to prevent the precursor foam and foamed article from oxidative degradation under heat. Examples of such a heat stabilizer (E) include n-octadecyl 3-(4'-hydroxy-3',5'-ditertiary butylphenyl)propionate, 1,1,3-tris(2-methyl-4-hydroxy-5-tertiary butylphenyl)butane, 1,3,5-tris-(4-tertiary butyl-3-hydroxy-2,6-dimethylbenzyl)-s-triazine-2,4,6-(1H,3H,5H)trione, 1,3,5-trimethyl-2,4,6-tris(3,5-ditertiary butyl-4-hydroxyphenyl)benzylbenzene, 1,3,5-tris(3,5-ditertiary butyl-4'-hydroxybenzyl)-s-triazine-2,4,6-(1H,3H,5H)trione and tetrakis[methylene-3(3,5-ditertiary butyl-4-hydroxyphenyl)propionate]methane. If an additive (F) having the function of preventing secondary agglomeration of the blowing agent [2] is mixed in advance with the blowing agent [2], the dispersibility of the blowing agent as uniform fine particles in the foamable sheet is increased and the resulting foamable-sheet can give a good foamed article free from large cells. Such an additive (F) may include metal soaps and surface-active agents, specifically metal salts of stearic acid and substances which are solid at the temperature at which the blowing agent [2] is incorporated, such as stearyl monoglyceride.

The heat-foamable crosslinked propylene resin composition in the form of a melt-shaped sheet structure can be produced by various methods known per se.

According to one embodiment, the resin (A), the resin (B), the radical initiator (C) and the crosslinking agent (D) and as required, the heat stabilizer (E) and the additive (F) are melt-mixed at a temperature at which the radical initiator (C) decomposes to form the crosslinked propylene resin composition [1]. The resulting composition is kneaded with the blowing agent [2] at a temperature below the decomposition temperature of the blowing agent to prepare the crosslinked propylene resin composition in the form of a melt-shaped sheet structure.

The sheet formation by kneading the crosslinked propylene resin composition [1] with the blowing agent [2] may be carried out, for example, by a method comprising dispersing the blowing agent in the crosslinked resin composition in the heat-molten state by using a twin-cylinder kneading machine such as a Brabender and thereafter forming the mixture into a sheet by a calender roll or a press molding machine, or by a method comprising kneading them by an extruder, and forming the mixture into a sheet by passing it through a T-die or a circular die. The method in which the kneaded mixture is extruded through a T-die at a temperature below the decomposition temperature of the blowing agent [2] is preferred because the number of process steps is small, the amount of energy required is small and the time required is short. Moreover, when this method is employed, the flatness or extruded surface texture of the resulting sheet is good, and by foaming, a foamed sheet having a good appearance can be obtained.

A foamed article can be obtained from the foamable sheet by various known methods, for example a press foaming method which comprises putting the trimmed foamable sheet in a press mold, closing the mold, heating the mold at a temperature at which the blowing agent [2] decomposes to generate a gas, and after the gas has generated, opening the mold and allowing the sheet to expand; a method which comprises placing the foamable sheet on a hot plate and foaming it under atmospheric pressure; a method which comprises placing the foamable sheet on a hot plate and foaming it while further applying heat of radiation to the sheet from above; a method which comprises suspending both ends of the foamable sheet, and heat-foaming it by applying heat of radiation and/or high-frequency radiation from above and/or below; a method which comprises placing the foamable sheet in an oven or the like heated to the decomposition temperature of the blowing agent [2] and foaming it by hot air; or a method which comprises heat-foaming the foamable sheet over or in a molten salt bath heated at above the decomposition temperature of the blowing agent [2].

According to another embodiment, a foamable crosslinked propylene resin composition can be formed by mixing the resin (A), the resin (B), the radical initiator (C), the crosslinking agent (D) and the blowing agent [2] and optionally the heat stabilizer (E) and the additive (F) in a mixer such as a Henschel mixer, a V blender, a ribbon blender or a tumbler blender, kneading the resulting composition in an extruder, preferably one equipped with a vent, at a temperature at which the radical initiator (C) decomposes but the blowing agent [2] does not decompose while absorbing unwanted volatile substances from the vent provided downstream of a high-temperature heating section of the extruder, and extruding the mixture through a T-die or a circular die fitted to the extruder to give a foamable sheet containing the blowing gent [2] in the substantially undecomposed state. The sheet structure can be foamed by the known methods described above.

Thus, according to the first-mentioned embodiment, there is provided a process for producing a heat-foamable crosslinked propylene resin composition in the form of a melt-shaped sheet structure, which comprises melt-kneading a mixture composed of (a) 60 to 95 parts by weight, per 100 parts by weight of resins (A) and (B) combined, of (A) a propylene resin containing 0 to 30 mole % of an alpha-olefin other than propylene and having a melt flow rate (MFR), determined by ASTM D1238L, of 0.1 to 50 g/10 min., (b) 5 to 40 parts by weight, per 100 parts by weight of the resins (A) and (B) combined, of (B) an alpha-olefin resin (B) selected from the group consisting of a propylene random copolymer resin (B1) composed of 55 to 85 mole % of propylene and 15 to 45 mole % of an alpha-olefin with 4 to 20 carbon atoms and having an amount of heat of crystal fusion, determined by thermal analysis on a differential scanning calorimeter, of 25 to 70 joules/g and a melt flow rate (MRR), determined by ASTM D1238L, of 0.05 to 20 g/10 min. and a 1-butene polymer or a 1-butene random copolymer resin (B2) composed of 70 to 100 mole % of 1-butene and 0 to 30 mole % of an alpha-olefin having 2, 3 or 5 to 20 carbon atoms and having an amount of heat of crystal fusion, determined by thermal analysis on a differential scanning calorimeter of 20 to 70 joules/g and a melt flow rate (MFR), determined by ASTM D1238L, of 0.05 to 50 g/10 min.

(c) 0.05 to 0.5 parts by weight, per 100 parts by weight of the resins (A) and (B) combined, of (C) a radical initiator, and (d) 0.1 to 1 part by weight, per 100 parts by weight of the resins (A) and (B) combined, of (D) a crosslinking agent, to crosslink the resins, and kneading 100 parts by weight of the resulting crosslinked propylene resin composition [1] with 0.5 to 5 parts by weight of [2] a blowing agent capable of generating a gas when heated, at a temperature below the decomposition temperature of the blowing agent thereby to form a melt-shaped sheet structure.

According to the latter embodiment, there is provided a process for producing a heat-foamable crosslinked propylene resin composition in the form of a melt-shaped sheet structure, which comprises kneading a mixture composed of (a) 60 to 95 parts by weight, per 100 parts by weight of resins (A) and (B) combined, of (A) a propylene resin containing 0 to 30 mole % of an alpha-olefin other than propylene and having a melt flow rate (MFR), determined by ASTM D1238L, of 0.1 to 50 g/10 min., (b) 5 to 40 parts by weight, per 100 parts by weight of the resins (A) and (B) combined, of (B) an alpha-olefin resin (B) selected from the group consisting of a propylene random copolymer resin (B1) composed of 55 to 85 mole % of propylene and 15 to 45 mole % of an alpha-olefin with 4 to 20 carbon atoms and having an amount of heat of crystal fusion, determined by thermal analysis on a differential scanning calorimeter, of 25 to 70 joules/g and a melt flow rate (MFR), determined by ASTM D1238L, of 0.05 to 20 g/10 min. and a 1-butene polymer or a 1-butene random copolymer resin (B2) composed of 70 to 100 mole % of 1-butene and 0 to 30 mole % of an alpha-olefin having 2, 3 or 5 to 20 carbon atoms and having an amount of heat of crystal fusion, determined by thermal analysis on a differential scanning calorimeter of 20 to 70 joules/g and a melt flow rate (MFR), determined by ASTM D1238L, of 0.05 to 50 g/10 min.

(c) 0.05 to 0.5 parts by weight, per 100 parts by weight of the resins (A) and (B) combined, of (C) a radical initiator, (d) 0.1 to 1 part by weight, per 100 parts by weight of the resins (A) and (B) combined, of (D) a crosslinking agent, and [2] 0.5 to 5 parts by weight, per 100 parts by weight of the components (a), (b), (c) and (d) combined, of a blowing agent capable of generating a gas when heated, at a temperature which is equal to or higher than the decomposition temperature of component (C) and at which the component [2] does not decompose.

The following examples illustrate the present invention more specifically. All parts in these examples are by weight.

EXAMPLE 1 AND COMPARATIVE EXAMPLES 1–8

These examples show the differences in the foamability improving effect of modifying resins.

Fifty-five parts of pellets of polypropylene resin I (B200, a product of Mitsui Petrochemical Industries, Ltd.; MFR=0.5/10 min.), 15 parts of a powder of resin I, 30 parts of each of the modifying resins shown in Table 1, 0.2 part of dicumyl peroxide as a radical initiator II, 0.5 part of divinylbenzene as a crosslinking agent III, and tetrakis[methylene-3(3,5-ditertiary butyl-4-hydroxyphenyl)propionate]methane (Irganox 1010, a tradename for a product of Ciba Geigy), n-octadecyl-3-(4'-hydroxy-3', 5'-ditertiary butylphenyl)propionate (Irganox 1076, a tradename for a product of Ciba Geigy) and calcium stearate as stabilizers each in an amount of 0.1 part were mixed by a high-speed mixer IV (Henschel mixer made by Mitsui-Miike Seisakusho) to produce a crosslinkable mixture.

The crosslinkable mixture was kneaded in an extruder V (a product of Thermoplastics Co.; cylinder diameter 20 mm; L/D=26) fitted with a screw having a dulmage section at a maximum temperature of 250° C. and a screw rotating speed of 60 rpm and extruded into a strand. The strand was cooled with water and cut to pellets by a rotating cutter.

One hundred parts of the resulting crosslinked pellets, 15 parts of a powder of resin I, and 2 parts of a mixture as a blowing agent IV of 100 parts of azodicarbonamide and 5 parts of stearyl monoglyceride, which had been prepared in advance by using a low-speed mixer (My Mixer MX-M2, a product of Matsushita Electrical Appliance Industry Co., Ltd.), were mixed by the aforesaid high-speed mixer IV to form a foamable mixture.

The foamable mixture was molded into a long sheet (to be referred to as the foamable sheet) by extruding it through an extruder made by fitting a full-flighted screw and a die having a generally fish tail-shape flow passage with an opening width of 50 mm and an opening thickness of 1 mm to the extruder V at a resin temperature of 190° C. and a screw rotating speed of 40 rpm.

The foamable sheet was cut into a generally disc-like piece having a weight of 2.2 g (to be referred to as the foamable sheet piece).

A press foaming mold was built by placing face to face a metal mold member having an opening with a diameter of 50 mm and a depth of 2 mm, a bottom portion with a diameter of 44 mm and a tapered frustoconical depressed portion and another metal mold member having a flat smooth surface. The mold was adapted to form a closed air-tight cavity by bringing the two mold members into contact with each other and pressing them. The mold had a flow passage for a cooling medium cooling the peripheral part of the cavity.

The press foaming mold was secured to a heat press molding machine (One Cycle Automatic Molding Machine Model SFA-50, a tradename for a product of Kamifuji Metal Industry Co., Ltd.) by mounting the mold members of the press foaming mold on the upper mold plate and the lower mold plate respectively of the press molding machine in a manner such that the foaming mold could be freely opened or closed.

Square tetrafluoroethylene sheets each having a thickness of 0.1 mm, a width of 100 mm and a length of 100 mm were laid over the upper and lower surfaces of the foamable sheet piece and the assembly was placed on an aluminum dish having a thickness of 0.2 mm formed in advance to conform to the depressed portion of the mold. The above press foaming mold was heated to 180° C., and the aluminum dish was placed in the depressed portion of the mold.

The mold members were caused to approach each other so that the distance between them was 5 mm. The foamable sheet was pre-heated for 1 minute to soften or melt it. The mold was closed, and after its temperature was elevated to 205° C., kept air-tight for about 7 minutes. The mold was then opened, and the molded article was taken out of the mold together with the tetrafluoroethylene sheets, and allowed to cool spontaneously. The molded article was obtained by removing the tetrafluoroethylene sheets.

The specific volume of the molded article was measured by an air comparison method and an outside dimension measuring method. The results are shown in Table 1 in the column under "Specific volume of the foam".

The methods of measuring the specific volume were as follows:

Air Comparison Method

The volume of the foamed article was measured by a 1-0.5-1 atmospheric pressure operating method using an air comparison pycnometer (Air Comparison Pycnometer Model 930 made by Beckmann Co.), and then divided by the weight of the molded article. The quotient is the specific volume of the foamed article by the air comparison method. The unit is $cm^3/g$ (to be simplified to cc/g hereinafter).

Outside Dimension Measuring Method

The thickness, width and length of the foamed article were measured by slide calipers, and its apparent volume was calculated from these dimensions. The apparent volume was divided by the weight of the foamed article. The quotient is the specific volume of the foamed article by the outside dimension measuring method. The unit is cm³/g (to be simplified to cc/g hereinafter).

TABLE 1

| Example (Ex.) or Comparative Example (CEx.) | Modifying resin | Specific volume of the foam (cc/g) | |
|---|---|---|---|
| | | Air comparison method | Outside dimension measuring method |
| Ex. 1 | PBR | 2.7 | 4.2 |
| CEx. 1 | Not added | 1.6 | 2.4 |
| CEx. 2 | EPR | 1.8 | 2.2 |
| CEx. 3 | EPT | 1.5 | 1.8 |
| CEx. 4 | TPE | 1.5 | 2.1 |
| CEx. 5 | LDPE | 1.7 | 2.2 |
| CEx. 6 | HDPE | 1.3 | 1.8 |
| CEx. 7 | EVA | 1.4 | 1.9 |
| CEx. 8 | EEA | 1.7 | 2.4 |

The modifying resins indicated by Table 1 by abbreviations were as follows.

PBR: Propylene/1-butene random copolymer having an MFR of 7.0 g/10 min., a propylene content of 71.0 mole %, an amount of heat of crystal fusion of 50 joules/g, a boiling n-heptane-insoluble content of 0.5%, a boiling methyl acetate-soluble content of 0.5%, and an MIT of 0.94.

EPR: Ethyelene/propylene random coplymer having an MFR of 0.8 g/10 min. and an ethylene content of 80.0 mole %.

EPT: Ethylene/propylene/diene terpolymer (Mitsu EPT 1071, a tradename for a product of Mitsui Petrochemical Co., Ltd.).

TPE: thermoplastic elastomer (Milastomer ® 8530N, a tradename for a product of Mitsu Petrochemical Industries, Ltd.)

HDPE: High-density polyethylene (Hizex 5000S, a tradename for a product of Mitsui Petrochemical Industries, Ltd.)

EVA: Ethylene/vinyl chloride copolymer (Evaflex V-5274, a tradename for a product of Du Pont Mitsui Polychemicals Co., Ltd.).

EEA: Ethyelene/vinyl acrylate copolymer (Mitsui-EEA A-702, a trademark for a product of Du Pont Mitsui Polychemical Co., Ltd.)

LDPE; Low-density polyethylene (MILASON ® M-9, a tradename for a product of Du Pont Mitsui Polychemicals, Co., Ltd.).

The results given in Table 1 show that the foamability of the foamable sheet in accordance with the process of this invention is far superior to those of foamable sheets obtained by a conventional method or a method other than the present invention.

EXAMPLE 2 AND COMPARATIVE EXAMPLES 9-11

These examples illustrate the effect of the propylene content of a propylene/alpha-olefin random copolymer.

Example 1 was repeated except that the propylene content of the propylene/1-butene random copolymer was changed as shown in Table 2; the amounts of the PP resin pellets, the propylene/1-butene random copolymer and the blowing agent VI were changed to 65 parts, 20 parts and 1 part, respectively; and the foaming temperature was adjusted to 210° C. The results are shown in Table 2.

TABLE 2

| Example (Ex.) or Comparative Example (CEx.) | Properties of the copolymer | | | | Specific volume of the foam (cc/g) | |
|---|---|---|---|---|---|---|
| | Propylene content (mole %) | MFR (g/10 min.) | Melting point (°C.) | Amount of heat of fusion (joules/g) | Air comparison method | Outside dimension measuring method |
| CEx. 9 | 100 | 0.62 | 160 | 101 | 2.4 | 2.8 |
| Ex. 2 | 75 | 6.5 | 111 | 47 | 3.1 | 3.6 |
| CEx. 10 | 44 | 3.5 | 75 | 20 | 2.4 | 2.8 |
| CEx. 11 | 34 | 3.2 | 66 | 11 | 1.9 | 2.5 |

In Comparative Example 9, no propylene/1-butene random copolymer was used, but polypropylene was used, and the properties shown in Table 2 are those of polypropylene.

As shown in Table 2, excellent foamability can be obtained when the propylene/alpha-olefin random copolymer used in the process of this invention has a propylene content, a melting point, an amount of heat of fusion and an MFR within the specified ranges.

EXAMPLES 3-6

These examples illustrate the effect of the type of polypropylene resin.

Example 2 was repeated except that the type of the polypropylene resin was changed as shown in Table 3; the weight of the foamable sheet piece was changed to 2.1 g; and the time during which the mold was maintained air-tight was changed to 4 minutes.

The results are shown in Table 3.

TABLE 3

| Example | PP resin Type | PP resin MFR (g/10 min.) | MFR of the kneaded mixture (g/10 min.) | Specific volume of the foam (cc/g) Air comparison method | Specific volume of the foam (cc/g) Outside dimension measuring method |
|---|---|---|---|---|---|
| 3 | PP-I | 0.5 | 0.67 | 2.7 | 3.7 |
| 4 | PP-II | 0.5 | 0.37 | 2.7 | 3.5 |
| 5 | PP-III | 7.0 | 5.45 | 2.6 | 4.0 |
| 6 | PP-IV | 5.0 | 2.50 | 2.5 | 3.0 |

The polypropylene resins used in these examples shown by abbreviations in Table 3 were as follows:

PP-I: Homopolymer of propylene

PP-II: Propylene/ethylene random copolymer (ethylene content 3.5 mole %)

PP-III: Homopolymer of propylene

PP-IV: Propylene/ethylene block copolymer (ethylene content 12 mole %)

As shown in Table 3, various kinds of polypropylene resin can be used in this invention.

EXAMPLES 7–12 AND COMPARATIVE EXAMPLES 12–13

These examples illustrate the effects of the amount of the blowing agent mixed and the foaming conditions.

Example 4 was repeated except that the amount of the blowing agent mixed and the foaming conditions were changed as indicated in Table 4; and the weight of the foamable sheet piece was changed to 2.2 g. The results are shown in Table 4.

TABLE 4

| Example (Ex.) or Comparative Example (CEx.) | Amount of the blowing agent mixed (parts) | Foaming conditions | | | Specific volume of the foam (cc/g) | |
|---|---|---|---|---|---|---|
| | | Foaming temperature (°C.) | Time during which the mold was maintained air-tight (min.) | Internal pressure (kg/cm²) | Air comparison method | Outside dimension measuring method |
| Ex. 7 | 1 | 200 | 5.5 | 18 | 3.0 | 5.2 |
| Ex. 8 | 2 | 200 | 5.0 | 20 | 3.5 | 5.0 |
| Ex. 9 | 3 | 200 | 4.0 | 27 | 3.3 | 4.6 |
| Ex. 10 | 4 | 200 | 3.5 | 38 | 2.5 | 3.4 |
| Ex. 11 | 1 | 230 | 4.0 | 18 | 2.9 | 3.7 |
| Ex. 12 | 2 | 230 | 3.0 | 28 | 2.7 | 3.7 |
| CEx. 12 | 3 | 230 | 2.5 | 48 | 1.7 | 2.6 |
| CEx. 13 | 4 | 230 | 2.5 | 51 | 1.7 | 2.6 |

As shown in Table 4, the preferred amount of the blowing agent to be mixed in this invention is 1 to 3 parts, and particularly when it is intended to shorten the time required for heating by increasing the foaming temperature, the preferred amount of the blowing agent is 1 to 2 parts.

EXAMPLES 13–15 AND COMPARATIVE EXAMPLE 14

These examples illustrate the effect of the amount of the propylene/alpha-olefin random copolymer mixed.

Example 1 was repeated except that the amount of the propylene/1-butene random copolymer mixed and the amount of the polypropylene resin pellets were changed as indicated in Table 5; the foaming temperature was changed to 230° C.; and the time during which the mold was maintained air-tight was changed to 3 minutes. The results are shown in Table 5.

TABLE 5

| Example (Ex.) or Comparative Example (CEx.) | Amount mixed (parts) | | MFR of the kneaded mixture (g/10 min.) | Specific volume of the foam (cc/g) | |
|---|---|---|---|---|---|
| | PP resin pellets | Random copolymer | | Air comparison method | Outside dimension measuring method |
| Ex. 13 | 55 | 30 | 1.00 | 2.4 | 3.3 |
| Ex. 14 | 65 | 20 | 0.67 | 3.3 | 4.4 |
| CEx. 15 | 75 | 10 | 0.91 | 2.0 | 2.6 |
| CEx. 14 | 85 | 0 | 0.41 | 1.6 | 2.4 |

Table 5 shows that the preferred amount of the propylene/1-butene random copolymer mixed in the process of this invention is 10 to 30 parts, especially 20 parts.

EXAMPLES 16–19

These examples illustrate the effect of removing odors by suction through a vent.

Example 4 was repeated except that instead of the extruder V, an extruder VI having a vent portion (a product of Thermoplastic Co.; cylinder diameter 25 mm; L/D=28; fitted with a three-stage screw for the vent) was used; and the crosslinked pellets were prepared while sucking the vent portion by a vacuum suction pump or while closing the vent portion and setting the maximum temperature of the kneading section of the extruder upstream of the vent portion at each of the temperatures indicated in Table 6. Foamability and odors were evaluated, and the results are shown in Table 6.

TABLE 6

| Example | Kneading temperature (°C.) | State of the vent | Evaluation of odors | | | Specific volume of the foam (cc/g) | |
|---|---|---|---|---|---|---|---|
| | | | Kneaded mixture | Foamable sheet | Foamed article | Air comparison method | Outside dimension measuring method |
| 16 | 220 | sucked | Δ | O | O | 2.5 | 3.6 |
| 17 | 250 | sucked | O | O | O | 2.6 | 3.5 |
| 18 | 220 | closed | X | X | Δ | 2.5 | 3.2 |
| 19 | 250 | closed | X | X~Δ | Δ~O | 2.5 | 3.2 |

The odors were evaluated by an organoleptic test, and rated on the following standards.

O: Good (no odor)
Δ: Fair (slight odor)
X: Poor (odoriferous)

It is seen from Table 6 that in the step of producing the crosslinked pellets in this invention, the sucking of the vent portion has a marked effect of removing odors, and that when the vent portion is closed, the kneading is preferably done at a higher temperature.

EXAMPLES 20–25

These examples illustrate the effect of the type of the crosslinking agent.

Example 4 was repeated except that the type of the crosslinking agent was changed as indicated in Table 7, and the kneading temperature in the step of producing the crosslinked pellets was lowered to 220° C. The results are shown in Table 7.

TABLE 7

| Example | Cross-linking agent | MFR of the kneaded mixture (g/10 min.) | Odor of the foam | Specific volume of the foam (cc/g) | |
|---|---|---|---|---|---|
| | | | | Air comparison method | Outside dimension measuring method |
| 20 | TAC | 36 | Δ | 2.3 | 3.3 |
| 21 | TAIC | 28 | O | 2.4 | 3.4 |
| 22 | P-300 | 29 | O | 2.4 | 3.7 |
| 23 | A-NPG | 30 | O | 2.4 | 3.7 |
| 24 | NK-HD | 9.4 | O | 2.7 | 3.8 |
| 25 | DVB | 0.8 | Δ | 2.7 | 3.8 |

The odor of the foamed article was evaluated organoleptically as indicated in Examples 16 to 19.

The abbreviations for the crosslinking aid in Table 7 have the following meanings.

TAC: triallyl cyanurate
TAIC: triallyl isocyanurate
P-300: pentaerythritol triacrylate
A-NPG: neopentyl glycol diacrylate
NK-HD: 1,6-hexanediol dimethacrylate
DVB: divinylbenzene It is seen from Table 7 that when a foamable sheet is to be produced in accordance with this invention by using an extruder having no vent suction portion, the use of crosslinking agents TAIC, P-300, A-NPG and NK-HD is preferred because it leads to good odors of the resulting foamed articles, and that the use of the crosslinking agent NK-HD is especially preferred because it gives a kneaded mixture having no excessively high MFR and permits easy molding of a foamed sheet in the molten state.

EXAMPLES 26–28

These examples illustrate that a foamable sheet prepared by this invention can be heat-foamed under atmospheric pressure.

The foamable sheet having a thickness of about 2 mm obtained in Example 2 was cut to a desired size. The resulting sheet was inserted between a pair of hot plates heated at 250° C. and spaced from each other by a distance of 5 mm, and heated under atmospheric pressure by the heat of radiation for each of the times indicated in Table 8. The foamed product was then taken out, and allowed to cool spontaneously to room temperature and thus solidified. The specific volume of the foamed article by the outside dimension measuring method was measured in the same way as in Example 2, and the results are shown in Table 8.

TABLE 8

| Example | Time used for heating under atmospheric pressure (minutes) | Specific volume by the outside dimension measuring method (cc/g) |
|---|---|---|
| 26 | 4 | 2.4 |
| 27 | 5 | 2.3 |
| 28 | 6 | 2.5 |

Table 8 demonstrates that the foamable sheets prepared in accordance with this invention has a foamability of as high as about 2.5 cc/g even when heated at a high temperature under atmospheric pressure.

EXAMPLE 29 AND COMPARATIVE EXAMPLES 15–22

Example 1 was repeated except that a 1-butene/propylene random copolymer having an MFR of 7.4 g/10 min., a 1-butene content of 75 mole %, and an amount of heat of crystal fusion of 36 joules/g (abbreviated BPR) was used instead of PBR. The results are shown in Table 9.

TABLE 9

| Example (Ex.) or Comparative Example (CEx.) | Modifying resin | Specific volume of the foam (cc/g) | |
|---|---|---|---|
| | | Air comparison method | Outside dimension measuring method |
| Ex. 29 | BPR | 2.6 | 4.3 |
| CEx. 15 | Not added | 1.6 | 2.4 |
| CEx. 16 | EPR | 1.8 | 2.2 |
| CEx. 17 | EPT | 1.5 | 1.8 |
| CEx. 18 | TPE | 1.5 | 2.1 |
| CEx. 19 | HDPE | 1.3 | 1.8 |
| CEx. 20 | LDPE | 1.7 | 2.2 |
| CEx. 21 | EVA | 1.4 | 1.9 |
| CEx. 22 | EEA | 1.7 | 2.4 |

EXAMPLES 30–31 AND COMPARATIVE EXAMPLES 23–24

These examples illustrate the effect of the 1-butene content of the 1-butene/alpha-olefin random copolymer.

Example 29 was repeated except that the 1-butene content of the 1-butene/propylene random copolymer was changed as indicated in Table 10; the amounts of the PP resin pellets, the 1-butene/propylene random copolymer, and blowing agent VI were changed to 65 parts, 20 parts and 1 part respectively; and the foaming temperature was changed to 210° C. The results are shown in Table 10.

In Example 30, a homopolymer of 1-butene was used, and the properties of the copolymer for Example 30 in Table 10 are those of this homopolymer.

TABLE 10

| Example (Ex.) or Comparative Example (CEx.) | Properties of the copolymer | | | | Specific volume of the foam (cc/g) | |
|---|---|---|---|---|---|---|
| | 1-Butene content (mole %) | MFR (g/10 min.) | Melting point (°C.) | Amount of heat of fusion (joules/g) | Air comparison method | Outside dimension measuring method |
| Ex. 30 | 100 | 0.13 | 117 | 40 | 3.1 | 3.6 |
| Ex. 31 | 75 | 7.4 | 80 | 36 | 2.9 | 3.7 |
| CEx. 23 | 66 | 3.2 | 66 | 11 | 1.9 | 2.5 |
| CEx. 24 | 54 | 3.5 | 75 | 20 | 2.4 | 2.8 |

As shown in Table 10, excellent foamability can be obtained when the propylene/alpha-olefin random copolymer used in this invention has a 1-butene content, a melting point, an amount of heat of fusion and an MFR within the specified ranges.

EXAMPLES 32–35

These examples illustrates the effect of the type of polypropylene resin.

Example 30 was repeated except that the type of the polypropylene resin was changed as shown in Table 11, the weight of the foamable sheet piece was changed to 2.1 g, and the time during which the mold was maintained airtight was changed to 4 minutes.

The results are shown in Table 11.

TABLE 11

| | | | Specific volume of the foam (cc/g) | |
|---|---|---|---|---|
| | PP resin | MFR of the kneaded mixture (g/10 min.) | Air comparison method | Outside dimension measuring method |
| Example | Type | MFR (g/10 min.) | | |
| 32 | PP-I | 0.5 | 0.54 | 3.3 | 4.4 |
| 33 | PP-II | 0.5 | 0.18 | 2.9 | 4.2 |
| 34 | PP-III | 7.0 | 10.3 | 2.9 | 4.2 |
| 35 | PP-IV | 5.0 | 4.25 | 2.8 | 3.9 |

The PP resins indicated in Table 11 were the same as those shown in Table 3.

It is seen from Table 11 that various kinds of PP resin can be used in this invention.

EXAMPLES 36–41 AND COMPARATIVE EXAMPLES 25–26

These examples illustrate the effects of the amount of the blowing agent mixed and the foaming conditions.

Example 33 was repeated except that the amount of the blowing agent mixed and the foaming conditions were changed as indicated in Table 12, and that the weight of the foamable sheet piece was changed to 2.2 g. The results are shown in Table 12.

TABLE 12

| Example (Ex.) or Comparative Example (CEx.) | Amount of the blowing agent mixed (parts) | Foaming conditions | | | Specific volume of the foam (cc/g) | |
|---|---|---|---|---|---|---|
| | | Foaming temperature (°C.) | Time during which the mold was maintained air-tight (min.) | Internal pressure (kg/cm²) | Air comparison method | Outside dimension measuring method |
| Ex. 36 | 1 | 200 | 5.5 | 16 | 2.6 | 4.3 |
| Ex. 37 | 2 | 200 | 5.0 | 18 | 3.0 | 4.1 |
| Ex. 38 | 3 | 200 | 4.0 | 25 | 2.9 | 3.8 |
| Ex. 39 | 4 | 200 | 3.5 | 36 | 2.2 | 2.8 |
| Ex. 40 | 1 | 230 | 4.0 | 16 | 2.5 | 3.1 |
| Ex. 41 | 2 | 230 | 3.0 | 26 | 2.3 | 3.1 |
| CEx. 25 | 3 | 230 | 2.5 | 46 | 1.5 | 2.1 |
| CEx. 26 | 4 | 230 | 2.5 | 49 | 1.5 | 2.1 |

As shown in Table 12, the preferred amount of the blowing agent to be mixed in this invention is 1 to 3 parts, and particularly when it is intended to shorten the time required for heating by increasing the foaming temperature, the preferred amount of the blowing agent is 1 to 2 parts.

EXAMPLES 42–46 AND COMPARATIVE EXAMPLE 27

These examples illustrate the effect of the amount of the 1-butene polymer mixed.

Example 33 was repeated except that the amount of the 1-butene polymer mixed and the amount of the PP resin pellets mixed were changed as indicated in Table 13, and the amount of the blowing agent VI was changed to 1 part. The results are shown in Table 13.

TABLE 13

| Example (Ex.) or Comparative Example (CEx.) | Amount mixed (parts) | | Specific volume of the foam (cc/g) | |
|---|---|---|---|---|
| | PP resin pellets | Random copolymer | Air comparison method | Outside dimension measuring method |
| Ex. 42 | 55 | 30 | 2.5 | 3.2 |
| Ex. 43 | 65 | 20 | 2.6 | 3.3 |
| Ex. 44 | 70 | 15 | 2.7 | 3.7 |
| Ex. 45 | 70 | 10 | 2.8 | 3.9 |
| Ex. 46 | 80 | 5 | 2.6 | 3.2 |
| CEx. 27 | 85 | 0 | 2.0 | 2.9 |

Table 13 shows that the preferred amount of the 1-butene polymer mixed in the process of this invention is 10 to 30 parts, especially 10 to 20 parts.

EXAMPLES 47–50

These examples illustrate the effect of removing odors suction through a vent.

Example 32 was repeated except that instead of the extruder V, an extruder VI having a vent portion (a product of Thermoplastic Co.; cylinder diameter 25 mm; L/D=28; fitted with a three-stage screw for the vent) was used; and the crosslinked pellets were prepared while sucking the vent portion by a vacuum suction pump or while closing the vent portion and setting the maximum temperature of the kneading section of the extruder upstream of the vent portion at each of the temperatures indicated in Table 14. Foamability and odors were evaluated, and the results are shown in Table 14.

TABLE 14

| Example | Kneading temperature (°C.) | State of the vent | Evaluation of odors - Kneaded mixture | Evaluation of odors - Foamable sheet | Evaluation of odors - Foamed article | Specific volume of the foam (cc/g) - Air comparison method | Specific volume of the foam (cc/g) - Outside dimension measuring method |
|---|---|---|---|---|---|---|---|
| 47 | 220 | sucked | Δ | O | O | 2.8 | 4.7 |
| 48 | 250 | sucked | O | O | O | 2.9 | 4.6 |
| 49 | 220 | closed | X | X | Δ | 2.8 | 4.2 |
| 50 | 250 | closed | X | X~Δ | Δ~O | 2.8 | 4.2 |

The odors were evaluated organoleptically as indicated in Examples 16 to 19.

It is seen from Table 14 that in the step of producing the crosslinked pellets in this invention, the sucking of the vent portion has a marked effect of removing odors, and that when the vent portion is closed, the kneading is preferably done at a higher temperature.

EXAMPLES 51-56

These examples illustrate the effect of the type of the crosslinking agent.

Example 32 was repeated except that the type of the crosslinking agent was changed as indicated in Table 15, and the kneading temperature in the step of producing the crosslinked pellets was lowered to 220° C. The results are shown in Table 15.

TABLE 15

| Example | Crosslinking agent | MFR of the kneaded mixture (g/10 min.) | Odor of the foam | Specific volume of the foam (cc/g) - Air comparison method | Specific volume of the foam (cc/g) - Outside dimension measuring method |
|---|---|---|---|---|---|
| 51 | TAC | 24 | Δ | 2.8 | 3.8 |
| 52 | TAIC | 19 | O | 2.9 | 3.9 |
| 53 | P-300 | 20 | O | 2.9 | 4.3 |
| 54 | A-NPG | 20 | O | 2.9 | 4.3 |
| 55 | NK-HD | 6.3 | O | 3.3 | 4.4 |
| 56 | DVB | 0.54 | Δ | 3.3 | 4.4 |

The odors were evaluated organoleptically as indicated in Examples 16 to 19.

The abbreviations for the crosslinking agents in Table 15 have the same meanings as indicated below Table 7.

It is seen from Table 15 that when a foamable sheet is to be produced in accordance with this invention by using an extruder having no vent suction portion, the use of crosslinking agents TAIC, P-300, A-NPG and NK-HD is preferred because it leads to good odors of the resulting foamed articles, and that the use of the crosslinking agent NK-HD is especially preferred because it gives a kneaded mixture having no excessively high MFR and permits easy molding of a foamed sheet in the molten state.

EXAMPLES 57-59

These examples illustrate that a foamable sheet prepared by this invention can be heat-foamed under atmospheric pressure.

The foamable sheet having a thickness of about 2 mm obtained in Example 32 was cut to a desired size. The resulting sheet was inserted between a pair of hot plates heated at 250° C. and spaced from each other by a distance of mm, and heated under atmospheric pressure by the heat of radiation for each of the times indicated in Table 16. The foamed product was then taken out, and allowed to cool spontaneously to room temperature and thus solidified. The specific volume of the foamed article by the outside dimension measuring method was measured in the same way as in Example 1, and the results are shown in Table 16.

TABLE 16

| Example | Time used for heating under atmospheric pressure (minutes) | Specific volume by the outside dimension measuring method (cc/g) |
|---|---|---|
| 57 | 4 | 2.9 |
| 58 | 5 | 2.7 |
| 59 | 6 | 3.0 |

Table 16 demonstrates that the foamable sheets prepared in accordance with the process of this invention has a fomablility of as high as about 3 cc/g even when heated at a high temperature under atmospheric pressure

EXAMPLE 60 AND COMPARATIVE EXAMPLES 28-35

These examples show differences in the foamability improving effect of modifying resins.

Seventy parts of a powder of polypropylene resin I (B200, a product of Mitsui Petrochemical Industries, Ltd.; MFR=0.5/10 min.), 30 parts of a refrigerated and crushed powder or an as-polymerized powder of each of the modifying resins indicated in Table 17, 0.1 part of dicumyl peroxide as a radical initiator III, 0.25 part of divinylbenzene as a crosslinking agent IV, and 2 parts of a blowing agent mixture V composed of 100 parts of azocarbonamide and 5 parts of stearyl monoglyceride obtained by premixing in a low-speed mixer (My Mixer MX-M2, a product of Matsushita Electrical Appliance Industry Co., Ltd.), and tetrakis[methylene-3(3,5-ditertiary butyl-4-hydroxyphenyl)propionate]methane (Irgaox 1010, a tradename for a product of Ciba Geigy), n-octadecyl-3-(4'-hydroxy-3',5'-ditertiary butylphenyl)-propionate (Irganox 1076, a tradename for a product of Ciba Geigy) and calcium stearate as stabilizers each in an amount of 0.1 part were mixed by a high-speed mixer VI (Henschel mixer made by Mitsui-Miike Seisakusho) to produce a crosslinkable mixture.

The crosslinkable mixture was extruded by an extruder VII (a product of Thermoplastics Co.; cylinder diameter 20 mm; L/D=26) fitted with a full-flighted screw and a die having a flow passage of a generally fish tail-shaped flow passage with an opening width of 50 mm and an opening thickness of 1 mm at a resin temperature of 190° C. and a screw rotating speed of 50 rpm to form a long sheet (to be referred to as the foamable sheet).

The foamable sheet was cut into a generally disc-like piece having a weight of 2.2 g (to be referred to as the foamable sheet piece).

A press foaming mold was built by placing face to face a metal mold member having an opening with a diameter of 50 mm and a depth of 2 mm, a bottom portion with a diameter of 44 mm and a tapered frustoconical depressed portion and another metal mold member having a flat smooth surface. The mold was adapted to form a closed air-tight cavity by bringing the two mold members into contact with each other and pressing them. The mold had a flow passage for a cooling medium cooling the peripheral part of the cavity.

The press foaming mold was secured to a heat press molding machine (One Cycle Automatic Molding Machine Model SFA-50, a tradename for a product of Kamifuji Metal Industry Co., Ltd.) by mounting the mold members of the press foaming mold on the upper mold plate and the lower mold plate respectively of the press molding machine in a manner such that the foaming mold could be freely opened or closed.

Square tetrafluoroethylene sheets each having a thickness of 0.1 mm, a width of 100 mm and a length of 100 mm were laid over the upper and lower surfaces of the foamable sheet piece and the assembly was placed on an aluminum dish having a thickness of 0.2 mm formed in advance to conform to the depressed portion of the mold. The above press foaming mold was heated to 180° C., and the aluminum dish was placed in the depressed portion of the mold.

The mold members were caused to approach each other so that that the distance between them was 5 mm. The foamable sheet was pre-heated for 1 minute to soften or melt it. The mold was closed, and after its temperature was elevated to 205° C., kept air-tight for about 7 minutes. The mold was then opened, and the molded article was taken out of the mold together with the tetrafluoroethylene sheets, and allowed to cool spontaneously. Then, the molded article was obtained by removing the tetrafluoroethylene sheets.

The specific volume of the molded article was measured by the same air comparison method as shown in Example 1. The appearance of the foamed product was evaluated by observing the roughness of the surface of the sheet visually and rated on the following standards.
O: Good
Δ: Fair
X: Poor The results are shown in Table 17.

The abbreviations of the modifying resins indicated in Table 17 have the same meanings as indicated below Table 1.

TABLE 17

| Example (Ex.) or Comparative Example (CEx.) | Modifying resin | Appearance of the sheet by visual observation | Specific volume of the foam (cc/g) |
|---|---|---|---|
| Ex. 60 | PBR | O | 2.8 |
| CEx. 28 | Not added | O | 1.8 |
| CEx. 29 | EPR | Δ | 1.7 |
| CEx. 30 | EPT | Δ | 1.4 |
| CEx. 31 | TPE | O | 1.4 |
| CEx. 32 | HDPE | O | 1.5 |
| CEx. 33 | LDPE | Δ | 1.6 |
| CEx. 34 | EVA | Δ | 1.3 |
| CEx. 35 | EEA | Δ | 1.6 |

EXAMPLE 61 AND COMPARATIVE EXAMPLES 36–38 These examples illustrate the effect of the properties of the propylene/alpha-olefin random copolymer. Example 60 was repeated except that each of the propylene/1-butene random copolymers having the properties indicated in Table 18 were used; the amounts of the PP resin powder, the propylene/1-butene random copolymer and the blowing agent VI were changed respectively to 80 parts, parts and 1 part; and the foaming temperature was changed to 210° C. The results are shown in Table 18.

TABLE 18

| Example (Ex.) or Comparative Example (CEx.) | Properties of the copolymer | | | | Specific volume of the foam (cc/g) |
|---|---|---|---|---|---|
| | Propylene content (mole %) | MFR (g/10 min.) | Melting point (°C.) | Amount of heat of fusion (joules/g) | |
| CEx. 36 | 100 | 0.62 | 160 | 101 | 2.3 |
| Ex. 61 | 75 | 0.5 | 111 | 47 | 3.0 |
| CEx. 37 | 44 | 3.5 | 75 | 20 | 2.3 |
| CEx. 38 | 34 | 3.2 | 66 | 11 | 1.8 | comparative Example 36, no propylene/1-butene random copolymer was used, but polypropylene was used, and the properties shown in Table 18 are those of polypropylene.

As shown in Table 18, excellent foamability can be obtained when the propylene/alpha-olefin random copolymer used in this invention has a propylene content, a melting point, an amount of heat of fusion and an MFR within the specified ranges.

EXAMPLES 62–65

These examples illustrate the effect of the type of polypropylene resin.

Example 61 was repeated except that the type of the polypropylene resin and the amount of the crosslinking agent IV were changed as shown in Table 19, the weight of the foamable sheet piece was changed to 2.1 g, and the time during which the mold was maintained air-tight was changed to 4 minutes.

The results are shown in Table 19.

TABLE 19

| | Properties of PP resin | | Amount of crosslinking agent IV (parts) | Specific volume of the foam (cc/g) |
|---|---|---|---|---|
| Example | Type | MFR (g/10 min.) | | |
| 62 | PP-I | 0.5 | 0.30 | 2.9 |
| 63 | PP-II | 0.5 | 0.25 | 2.9 |
| 64 | PP-III | 7.0 | 0.50 | 2.8 |
| 65 | PP-IV | 5.0 | 0.50 | 2.7 |

The abbreviations for the PP resins indicated in Table 19 have the same meanings as indicated below Table 3.

As shown in Table 19, various kinds of polypropylene resin can be used in this invention.

EXAMPLES 66–68 AND COMPARATIVE EXAMPLE 39

These examples illustrate the effects of the amount of the blowing agent mixed.

Example 63 was repeated except that the amount of the blowing agent mixed was changed as indicated in Table 20, the foaming temperature was changed to 200° C.; and the other foaming conditions were changed as indicated in Table 20. The results are shown in Table 20.

TABLE 20

| Example (Ex.) or Comparative Example (CEx.) | Amount of the blowing agent (parts) | State of the sheet | | Foaming conditions | | Specific volume of the foam (cc/g) |
|---|---|---|---|---|---|---|
| | | Appearance | State of foaming | Time during which the mold was maintained air-right (min.) | Internal pressure (kg/cm$^2$) | |
| Ex. 66 | 1 | O | O | 5.5 | 18 | 3.2 |
| Ex. 67 | 2 | O | O | 5.0 | 20 | 3.7 |
| Ex. 68 | 3 | O | Δ | 4.0 | 25 | 3.5 |
| CEx. 39 | 4 | O | X | 3.0 | 20 | 2.0 |

The state of foaming of the sheet indicated in Table 20 was evaluated on the following standards.

O: not foamed
Δ: partly foamed
X: foamed entirely and gas-escaped portions existed As shown in Table 20, the preferred amount of the blowing agent mixed in this invention is 1 to 3 parts.

EXAMPLES 69-71 AND COMPARATIVE EXAMPLE 40

These examples illustrate the effect of the amount of the propylene/alpha-olefin random copolymer mixed.

Example 60 was repeated except that the amount of the propylene/1-butene random copolymer mixed and the amount of the polypropylene resin pellets were changed as indicated in Table 21; the foaming temperature was changed to 230° C.; and the time during which the mold was maintained air-tight was changed to 3 minutes. The results are shown in Table 21.

TABLE 21

| Example (Ex.) or Comparative Example (CEx.) | Amount mixed (parts) | | Specific volume of the foam (cc/g) |
|---|---|---|---|
| | PP resin | Random copolymer | |
| Ex. 69 | 70 | 30 | 2.6 |
| Ex. 70 | 80 | 20 | 3.5 |
| Ex. 71 | 90 | 10 | 2.2 |
| CEx. 40 | 100 | 0 | 1.8 |

As shown in Table 21, the preferred amount of the propylene/1-butene random copolymer in this invention is 10 to 30 parts by weight, especially 20 parts by weight.

EXAMPLES 72-75

These examples illustrate the effect of removing odors by suction through a vent.

Example 63 was repeated except that instead of the extruder VII, an extruder VIII having a vent portion (a product of Thermoplastic Co.; cylinder diameter 25 mm; L/D=28; fitted with a three-stage screw for the vent) was used; and a foamable sheet was prepared by using a sheet-forming T-die while sucking the vent portion by a vacuum suction pump or while opening the vent portion, or while closing the vent portion and setting the maximum temperature of the kneading section of the extruder upstream of the vent portion at each of the temperatures indicated in Table 22. Foamability and odors were evaluated, and the results are shown in Table 22.

TABLE 22

| Example | Sheet molding temperature (°C.) | State of the vent | Evaluation of odors | | | Specific volume of the foam (cc/g) |
|---|---|---|---|---|---|---|
| | | | State of foaming | Foamable sheet | Foamed article | |
| 72 | 180 | sucked | O | O | O | 2.7 |
| 73 | 190 | sucked | O | O | O | 2.8 |
| 74 | 190 | opened | O | X~Δ | Δ~O | 2.7 |
| 75 | 190 | closed | Δ~O | X | Δ | 2.7 |

The odors were evaluated organoleptically on the same standards as indicated below Table 6.

The state of foaming was evaluated as indicated below Table 20.

It is seen from Table 22 that in the step of producing the foamable sheet in accordance with the present invention, the sucking of the vent portion has a marked effect of removing odors, and that the opening of the vent portion is also effective for reducing odors.

EXAMPLES 76-81

These examples illustrate the effect of the type of the crosslinking agent.

EXAMPLE 63 was repeated except that the type and the amount of the crosslinking aid was changed as indicated in Table 23. The results are shown in Table 23.

The odor of the foamed article was evaluated organoleptically as indicated in Examples 16 to 19.

The abbreviations for the crosslinking agents in Table 23 have the same meanings as indicated below Table 7.

TABLE 23

| Example | Crosslinking agent | | Foamed article | |
|---|---|---|---|---|
| | Type | Amount (parts) | Specific volume (cc/g) | Odor |
| 76 | TAC | 0.50 | 2.5 | Δ |
| 77 | TAIC | " | 2.6 | O |
| 78 | P-300 | " | 2.6 | O |
| 79 | A-NPG | " | 2.6 | O |
| 80 | NK-HD | " | 2.9 | O |
| 81 | DVB | 0.25 | 2.9 | Δ |

It is seen from Table 23 that when a foamable sheet is to be produced by using an extruder having no vent portion in accordance with this invention, the use of the crosslinking agents TAIC, P-300, A-NPG and NK-HD is preferred because it leads to "good" odors of the resulting foamed articles, and the use of the crosslinking agent NK-HD is especially preferred because it permits easy molding of the foamable sheet.

EXAMPLE 82

This example illustrates that a foamable sheet prepared by this invention can be heat-foamed under atmospheric pressure. The foamable sheet having a thickness of about 2 mm obtained in Example 61 was cut to a desired size. The resulting sheet was inserted between a pair of hot plates heated at 250° C. and spaced from each other by a distance of mm, and heated under atmospheric pressure by the heat of radiation for 5 minutes. The foamed product was then taken out, and allowed to cool spontaneously to room temperature and thus solidified to form a foamed article. A rectangular-parallelpipedal foam piece was prepared from the resulting foamed article, and its outside dimensions were measured by slide calipers. Its volume was then calculated from the measured dimensions, and then divided by the weight of the foam piece. The quotient, which is the specific volume of the foam piece by the outside dimension measurement, was 2.5 cc/g.

EXAMPLE 83 AND COMPARATIVE EXAMPLES 41-48

These examples illustrate differences in the foamability improving effects of modifying resins.

Example 60 was repeated except that BPR was used instead of PBR. The results are shown in Table 24.

TABLE 24

| Example (Ex.) or Comparative Example (CEx.) | Modifying resin | Appearance of the sheet by visual observation | Specific volume of the foam (cc/g) |
| --- | --- | --- | --- |
| Ex. 83 | PBR | O | 2.7 |
| CEx. 41 | Not added | O | 1.8 |
| CEx. 42 | EPR | Δ | 1.7 |
| CEx. 43 | EPT | Δ | 1.4 |
| CEx. 44 | TPE | O | 1.4 |
| CEx. 45 | HDPE | O | 1.5 |
| CEx. 46 | LDPE | Δ | 1.6 |
| CEx. 47 | EVA | Δ | 1.3 |
| CEx. 48 | EEA | Δ | 1.6 |

EXAMPLES 84-85 AND COMPARATIVE EXAMPLES 49-50

These examples illustrate the effect of the properties of the 1-butene/alpha-olefin random copolymer.

Example 83 was repeated except that each of the 1-butene/propylene random copolymers having the properties indicated in Table 25 was used; the amounts of the PP resin powder, the 1-butene/propylene random copolymer and the blowing agent VI were changed respectively to 80 parts, 20 parts and 1 part; and the foaming temperature was changed to 210° C. The results are shown in Table 25.

TABLE 25

| Example (Ex.) or Comparative Example (CEx.) | Properties of the copolymer | | | | Specific volume of the foam (cc/g) |
| --- | --- | --- | --- | --- | --- |
| | 1-Butene content (mole %) | MFR (g/10 min.) | Melting point (°C.) | Amount of heat of fusion (joules/g) | |
| Ex. 84 | 100 | 0.13 | 117 | 40 | 3.0 |
| Ex. 85 | 75 | 7.4 | 80 | 36 | 2.8 |
| CEx. 49 | 66 | 3.2 | 66 | 11 | 1.8 |
| CEx. 50 | 54 | 3.5 | 75 | 20 | 2.2 |

In Example 84, no 1-butene/propylene random copolymer was used, but poly(1-butene) was used, and the properties shown in Table 25 are those of poly(1-butene).

As shown in Table 25, excellent foamability can be obtained when the 1-butene/alpha-olefin random copolymer used in the process of this invention has a 1-butene content, a melting point, an amount of heat of fusion and an MFR within the specified ranges.

EXAMPLES 86-89

These examples illustrates the effect of the type of polypropylene resin.

Example 84 was repeated except that the type of the polypropylene resin and the amount of the crosslinking agent IV mixed were changed as shown in Table 26; the weight of the foamable sheet piece was changed to 2.1 g, and the time during which the mold was maintained air-tight was changed to 4 minutes.

The results are shown in Table 26.

TABLE 26

| Example | Properties of PP resin | | Amount of crosslinking agent IV (parts) | Specific volume of the foamed article (cc/g) |
| --- | --- | --- | --- | --- |
| | Type | MFR (g/10 min.) | | |
| 86 | PP-I | 0.5 | 0.25 | 2.7 |
| 87 | PP-II | 0.5 | 0.25 | 2.8 |
| 88 | PP-III | 7.0 | 0.50 | 2.7 |
| 89 | PP-IV | 5.0 | 0.50 | 2.6 |

The abbreviations for the PP resins indicated in Table 26 have the same meanings as indicated below Table 3.

EXAMPLES 90-93

These examples illustrate the effects of the amount of the blowing agent mixed.

Example 87 was repeated except that in the preparation of the foamable sheet, the amount of the blowing agent mixed was changed as indicated in Table 27; and then the foaming temperature was changed to 200° C., and the other foaming conditions were changed as indicated in Table 27.

The results are shown in Table 27.

The state of foaming of the sheet was evaluated on the same standards as indicated below Table 20.

TABLE 27

| Example | Amount of the blowing Agent (parts) | State of the sheet Appearance | State of the sheet State of foaming | Foaming conditions Time during which the mold was maintained air-right (min.) | Internal pressure (kg/cm²) | Specific volume of the foam (cc/g) |
|---|---|---|---|---|---|---|
| 90 | 1 | O | O | 5.5 | 18 | 2.9 |
| 91 | 2 | O | O | 5.0 | 20 | 3.4 |
| 92 | 3 | O | Δ | 4.0 | 25 | 3.2 |
| 93 | 4 | O | Δ~X | 3.5 | 20 | 2.5 |

As shown in Table 27, the preferred amount of the blowing agent mixed in this invention is 1 to 3 parts.

EXAMPLES 94–66 AND COMPARATIVE EXAMPLE 51

These examples illustrate the effect of the amount of the 1-butene polymer mixed.

Example 84 was repeated except that the amount of the 1-butene polymer mixed and the amount of the polypropylene resin mixed were changed as indicated in Table 28; the foaming temperature was changed to 230° C.; and the time during which the mold was maintained air-tight was changed to 3 minutes. The results are shown in Table 28.

TABLE 28

| Example (Ex.) or Comparative Example (CEx.) | Amounts mixed (parts) PP resin | Amounts mixed (parts) 1-Butene polymer | Specific volume of the foam (cc/g) |
|---|---|---|---|
| Ex. 94 | 70 | 30 | 2.7 |
| Ex. 95 | 80 | 20 | 3.0 |
| Ex. 96 | 90 | 10 | 2.8 |
| CEx. 51 | 100 | 0 | 2.2 |

As shown in Table 28, the preferred amount of the 1-butene polymer in this invention is 10 to 30 parts by weight, especially 10 to 20 parts by weight.

EXAMPLES 97–100

These examples illustrate the effect of removing odors by suction through a vent.

Example 86 was repeated except that instead of the extruder VII, an extruder VIII having a vent portion (a product of Thermoplastic Co.; cylinder diameter 25 mm; L/D=28; fitted with a three-stage screw for the vent) was used; and a foamable sheet was prepared by using a sheet-forming T-die while sucking the vent portion by a vacuum suction pump, while opening the vent portion, or while closing the vent portion and setting the maximum temperature of the kneading section of the extruder upstream of the vent portion at each of the temperatures indicated in Table 29. Foamability and odors were evaluated, and the results are shown in Table 29.

TABLE 29

| Example | Sheet-foaming temperature (°C.) | State of the vent | Evaluation of odors State of foaming of the sheet | Evaluation of odors Foamable sheet | Evaluation of odors Foamed article | Specific volume of the foam (cc/g) |
|---|---|---|---|---|---|---|
| 97 | 180 | sucked | O | O | O | 3.0 |
| 98 | 190 | sucked | O | O | O | 3.1 |
| 99 | 190 | opened | O | X~Δ | Δ~O | 3.0 |
| 100 | 190 | closed | Δ~O | X | Δ | 3.0 |

The odor of the foamed article was evaluated organoleptically as indicated in Examples 16 to 19.

The state of foaming of the sheet was evaluated as indicated below Table 20.

It is seen that From Table 29 that in the step of producing the foamable sheet in accordance with the present invention, the sucking of the vent portion has a marked effect of removing odors, and that the opening of the vent portion is also effective for reducing odors.

EXAMPLES 101–106

These examples illustrate the effect of the type of the crosslinking agent.

Example 86 was repeated except that the type and the amount of the crosslinking agent was changed as indicated in Table 30. The results are shown in Table 30.

The odor of the foamed article was evaluated organoleptically as indicated in Examples 16 to 19.

The abbreviations of or the crosslinking agent in Table 30 have the same meanings as indicated below Table 7.

TABLE 30

| Example | Crosslinking agent Kind | Crosslinking agent Amount (parts) | Foamed article Specific volume (cc/g) | Foamed article Odor |
|---|---|---|---|---|
| 101 | TAC | 0.50 | 2.6 | Δ |
| 102 | TAIC | " | 2.7 | O |
| 103 | P-300 | " | 2.7 | O |
| 104 | A-NPG | " | 2.7 | O |
| 105 | NK-HD | " | 3.0 | O |
| 106 | DVB | 0.25 | 3.1 | Δ |

It is seen from Table 30 that when a foamable sheet is to be produced by using an extruder having no vent portion in accordance with this invention, the use of the crosslinking agents TAIC, P-300, A-NPG and NK-HD is preferred because it leads to "good" odors of the resulting foamed articles, and the use of the crosslinking aid NK-HD is especially preferred because it imparts good foamability to the foamability to the foamable sheet.

EXAMPLE 107

This example illustrates that a foamable sheet prepared by the process of this invention can be heat-foamed under atmospheric pressure.

The foamable sheet having a thickness of about 2 mm obtained in Example 84 was cut to a desired size. The resulting sheet was inserted between a pair of hot plates heated at 250° C. and spaced from each other by a distance of mm, and heated under atmospheric pressure by the heat of radiation for 5 minutes. The foamed product was then taken out, and allowed to cool spontaneously to room temperature and thus solidified to form a foamed article. A rectangular-parallelpipedal foam piece was prepared from the resulting foamed article, and its outside dimensions were measured by slide calipers. Its volume was then calculated from the measured dimensions, and then divided by the weight of the foam piece. The quotient, which is the specific volume of the foam piece by the outside dimension measurement, was 2.9 cc/g.

It is therefore seen that the foamable sheet in accordance with this invention has good foamability also when it is foamed under atmospheric pressure.

What is claimed is:

1. A heat-foamable crosslinked propylene resin composition in the form of a melt-shaped sheet structure comprising
   (1) 100 parts by weight of a partially crosslinked polypropylene resin composition obtained by mixing at least four components composed of (A) a propylene resin, (B) an olefin resin other than the resin (A), 0.05 to 0.05 parts by weight, per 100 parts by weight of the resins (A) and (B) combined, of a radical initiator (C) and 0.1 to 1 part by weight, per 100 parts by weight of the resins (A) and (B) combined, of (D) a crosslinking agent at a temperature at which the radical initiator decomposes to form a partially crosslinked propylene resin (1), and
   (2) 0.5 to 5 parts by weight of a blowing agent capable of generating a gas when heated at the temperature at which the heat-foaming partially crosslinked propylene resin composition in the form of a melt-shaped sheet structure is foamed; wherein
   (a) the propylene resin (A) is an amount of 60 to 95 parts by weight per 100 parts by weight of the resins (A) and (B) combined, contains 0 to 30 mole % of an alpha-olefin other than propylene and has a melt flow rate (MFR), determined by ASTM D1238L, of 0.1 to 50 g/10 min., and
   (b) the alpha-olefin resin (B) is in an amount of 5 to 40 parts by weight per 100 parts by weight of the resins (A) and (B) combined, and is selected from the group consisting of (B1) a propylene random copolymer resin other than the propylene resin (A) and composed of 55 to 85 mole % of propylene and 15 to 45 mole % of an alpha-olefin with 4 to 20 carbon atoms and having an amount of heat of crystal fusion, determined by thermal analysis on a differential scanning calorimeter, of 25 to 70 joules/g and a melt flow rate (MFR), determined by ASTM D1238L, of 0.05 to 20 g/10 min. and having a DSC melting point of 90° to 120° C., and (B2) a 1-butane polymer or a 1-butene random copolymer resin composed of 70 to 100 mole % of 1-butene and 0 to 30 mole % of an alpha-olefin having 2, 3 or 5 to 20 carbon atoms and having an amount of heat of crystal fusion, determined by thermal analysis of a differential scanning calorimeter of 20 to 70 joules/g and a melt flow rate (MFR), determined by ASTM D1238L, of 0.05 to 50 g/10 min.

2. A process for producing a heat-foamable crosslinked propylene resin composition in the form of a melt-shaped sheet structure, which comprises melt-kneading a mixture composed of
   (a) 60 to 95 parts by weight, per 100 parts by weight of resins (A) and (B) combined, of (A) a propylene resin containing 0 to 30 mole % of an alpha-olefin other than propylene and having a melt flow rate (MFR), determined by ASTM D1238L, of 0.1 to 50 g/10 min.,
   (b) 5 to 40 parts by weight, per 100 weight of the resins (A) and (B) combined, of (B) an alpha-olefin resin selected from the group consisting of (B1) a propylene random copolymer resin other than the propylene resin (A) and composed of 55 to 85 mole % of propylene and 15 to 45 mole % of an alpha-olefin with 4 to 20 carbon atoms and having an amount of heat of crystal fusion, determined by thermal analysis on a differential scanning calorimeter, of 25 to 75 joules/g and a melt flow rate (MFR), determined by ASTM D1238L, of 0.05 to 20 g/10 min. and (B2) a 1-butene polymer or a 1-butene random copolymer resin composed of 70 to 100 mole % of 1-butene and 0 to 30 mole % of an alpha-olefin having 2,3 or 5 to 20 carbon atoms and having an amount of heat of crystal fusion, determined by thermal analysis on a differential scanning calorimeter of 20 to 70 joules/g and a melt flow rate (MFR), determined by ASTM D1238L, of 0.05 to 50 g/10 min,
   (c) 0.05 to 0.5 parts by weight, per 100 parts by weight of the resins (A) and (B) combined, of (C) a radical initiator, and
   (d) 0.1 to 1 part by weight, per 100 parts by weight of the resins (A) and (B) combined, of (D) a crosslinking agent.
   to crosslink the resins, and kneading 100 parts by weight of the resulting crosslinked propylene resin composition (1) with 0.5 to 5 parts by weight of (2) a blowing agent capable of generating a gas when heated, at a temperature below the decomposition temperature of the blowing agent.

3. A process for producing the heat-foamable crosslinked propylene resin composition of claim 1, which comprises kneading a mixture composed of
   (a) 60 to 95 parts by weight, per 100 parts by weight of resins (A) and (B) combined, of (A) a propylene resin containing 0 to 30 mole % of an alpha olefin other than propylene and having a melt flow rate (MFR), determined by ASTM D1238L, of 0.1 to 50 g/10 min.,
   (b) 5 to 40 parts by weight, per 100 parts by weight of the resins (A) and (B) combined, of (B) an alpha-olefin resin selected from the group consisting of (B1) a propylene random copolymer resin other than the propylene resin (A) and composed of 55 to 85 mole % of propylene and 15 to 45 mole % of an alpha olefin with 4 to 20 carbon atoms and having an amount of heat of crystal fusion, determined by thermal analysis on a differential scanning calorimeter, of 25 to 70 joules/g and melt flow rate (MFR), determined by ASTM D1238L, of 0.05 to 20 g/10 min. and (B2) a 1-butene polymer or a 1-butene random copolymer resin composed of 70 to 100 mole % of 1-butene and 0 to 30 mole % of an alpha-olefin having 1, 2 or 5 to 20 carbon atoms and having an amount of heat of crystal fusion, determined by thermal analysis on a differential scanning calorimeter of 20 to 70 joules/g and a melt flow rate (MFR), determined by ASTM D1238L, or 0.05 to 50 g/10 min.

(c) 0.05 to 0.5 parts by weight, per 100 parts by weight of the resins (A) and (B) combined, of (C) a radical initiator, (d) 0.1 to 1 part by weight, per 100 parts by weight of the resins (A) and (B) combined, of (D) a crosslinking agent, and (2) 0.5 to 5 parts by weight, per 100 parts by weight of the components (a), (b), (c) and (d) combined, of a blowing agent capable of generating a gas when heated, at a temperature which is equal to or higher than the decomposition temperature of component (c) and at which the component (d) does not decompose.

4. The composition of claim 1 wherein the propylene resin (A) is a crystalline propylene homopolymer or a propylene copolymer with less than 15 mole % of an alpha-olefin having from 2 to 10 carbon atoms.

5. The composition of claim 1 wherein the propylene resin A) has an MFR of 0.5 to 20 g/10 min.

6. The composition of claim 1 wherein the alpha-olefin resin (B) is the propylene random copolymer resin (B1) and is composed of 60 to 80 mole % of propylene and 20 to 40 mole % of an alpha-olefin with 4 to 20 carbon atoms and has a heat of crystal fusion of 30 to 60 joules/g and an MFR of 0.1 to 10 g/10 min.

7. The composition of claim 1 wherein the alpha-olefin resin (B) is the 1-butene polymer or 1-butene random copolymer resin (B2) composed of 75 to 100 mole % of 1-butene and 0 to 25 mole % of an alpha-olefin having 2, 3 or 5 to 20 carbon atoms, and having an amount of heat of crystal fusion of 30 to 60 joules/g and an MFR of 0.1 to 20g/10 min.

8. The composition of claim 1 wherein the propylene random copolymer resin (B1) has a DSC melting point of 80° to 130° C. and the 1-butene polymer of 1-butene random copolymer resin (B2) has a DSC melting point of 70° to 130° C.

9. The composition of claim 8 wherein the alpha-olefin resin (B) is the resin (B1) and has a microisotacticity, based on 3-propylene chains, of at least 0.7, and a boiling n-heptane-insoluble content of mor more than 5% by weight.

10. The composition of claim 1 wherein the radical initiator (C) is an organic peroxide or an organic peroxy ester.

11. The composition of claim 1 wherein the crosslinking agent (D) is a polyfunctional unsaturated compound, an oxime compound, a nitroso compound or a maleimide compound.

12. The composition of claim 1 wherein the crosslinking agent (D) is selected from the group consisting of triallyl cyanurate, triallyl isocyanurate, ethylene glycol dimethyacrylate, trimethylolpropane trimethacrylate, diallyl phthalate, pentaerythritol triacylate, neopentyl glycol diacrylate, 1,6-hexanediol dimethacrylate, divinylbenzene, quinonedioxime, benzoquinonedioxime, p-nitrosophenol and N,N-m-phenylene bismaleimaide.

13. The composition of claim 1 which comprises, per 100 parts by weight of the resins (A) and (B) combined, 70 to 90 parts by weight of the propylene resin (A), 10 to 30 parts by weight of the resin (B), 0.1 to 0.3 parts by weight of the radical initiator (C) and 0.2 to 0.5 parts by weight of the crosslinking agent (D).

14. The composition of claim 13 wherein the amount of the blowing agent, per 100 parts by weight of the crosslinked propylene resin composition is from 1 to 3 parts by weight.

15. The composition of claim 1 wherein the crosslinking agent is 1,6-hexanediol dimethacrylate.

* * * * *

UNITED STATES PATENT AND TRADEMARK OFFICE
CERTIFICATE OF CORRECTION

PATENT NO. : 4,870,114
DATED : September 26, 1989
INVENTOR(S) : Takashi Hashimoto and Zenichi Sasaki It is certified that error appears in the above-identified patent and that said Letters Patent is hereby corrected as shown below:

Claim 1, line 8, delete the second occurrence of "0.05", insert therefor --0.5--;

line 20, after "is", insert --in--;

line 39, delete "1-butane", i nsert --1-butene--;

line 43, after "analysis", delete "of", insert therefor --on--.

Claim 3, line 42 (last line), delete "(d)", insert --(2)--.

Claim 5, line 2, delete "A)", insert --(A)--.

Signed and Sealed this

Thirtieth Day of October, 1990

Attest:

HARRY F. MANBECK, JR.

Attesting Officer

Commissioner of Patents and Trademarks